(12) United States Patent
Li et al.

(10) Patent No.: US 12,109,550 B2
(45) Date of Patent: Oct. 8, 2024

(54) PREPARATION METHOD OF AM-TYPE POLYSTYRENE MICROSPHERE OFLOXACIN IMPRINTED POLYMER AND APPLICATION THEREOF

(71) Applicant: Zhaoqing Medical College, Zhaoqing (CN)

(72) Inventors: Yanbin Li, Taizhou (CN); Lirong Li, Taizhou (CN); Yizhi Hu, Taizhou (CN); Hongfang He, Taizhou (CN); Fengdi Tang, Taizhou (CN)

(73) Assignee: Zhaoqing Medical College, Zhaoqing (CN)

( * ) Notice: Subject to any disclaimer, the term of this patent is extended or adjusted under 35 U.S.C. 154(b) by 626 days.

(21) Appl. No.: 17/243,133

(22) Filed: Apr. 28, 2021

(65) Prior Publication Data
US 2021/0402371 A1 Dec. 30, 2021

(30) Foreign Application Priority Data
Jun. 24, 2020 (CN) .......................... 202010584769.8

(51) Int. Cl.
*B01J 20/26* (2006.01)
*B01J 20/28* (2006.01)
*B01J 20/32* (2006.01)
*C08F 257/02* (2006.01)

(52) U.S. Cl.
CPC ....... *B01J 20/268* (2013.01); *B01J 20/28019* (2013.01); *B01J 20/321* (2013.01); *B01J 20/3217* (2013.01); *B01J 20/3227* (2013.01); *B01J 20/327* (2013.01); *B01J 20/3278* (2013.01); *B01J 20/3293* (2013.01); *C08F 257/02* (2013.01)

(58) Field of Classification Search
CPC ................ B01J 20/268; B01J 20/28019; B01J 20/321; B01J 20/3217; B01J 20/3227; B01J 20/327; B01J 20/3278; B01J 20/3293; C08F 257/02
See application file for complete search history.

(56) References Cited

U.S. PATENT DOCUMENTS

| | | | |
|---|---|---|---|
| 6,376,618 B1 * | 4/2002 | Mitchell | ................. A61L 15/20 525/329.9 |
| 6,531,523 B1 * | 3/2003 | Davankov | .............. B01J 20/261 521/65 |

OTHER PUBLICATIONS

Shi et al., Electrophoresis, (2011), v32, p. 1348-1356.*

* cited by examiner

*Primary Examiner* — Yong L Chu
(74) *Attorney, Agent, or Firm* — Myers Bigel, P.A.

(57) ABSTRACT

The present disclosure provides a preparation method of AM-type polystyrene microsphere ofloxacin imprinted polymer as well as an application thereof. A monomer acrylamide and an initiator ammonium persulfate are subjected to graft polymerization on the surface of modified polystyrene primary amine resin, to get grafted particles; then an adsorption test of a levofloxacin solution by the grafted particles PAM/PSA is conducted, and then a levofloxacin surface molecularly imprinted material MIP-PAM/PSA is prepared by using ethylene glycol diglycidyl ether as the crosslinking agent. The present disclosure can realize the separation and purification of racemic ofloxacin effectively, thus providing a new method and material for separating and enriching s-type ofloxacin in the industry. Because the antibacterial efficacy of S-ofloxacin on Gram-negative bacteria and positive bacteria is 8-128 times that of its enantiomer R-ofloxacin, so the present technology can improve the efficacy of a drug greatly.

3 Claims, 11 Drawing Sheets

PREPARATION METHOD OF AM-TYPE POLYSTYRENE MICROSPHERE OFLOXACIN IMPRINTED POLYMER AND APPLICATION THEREOF

TECHNICAL FIELD

The present disclosure relates to a preparation method of AM-type polystyrene microsphere ofloxacin imprinted polymer and an application thereof, belonging to the technical field of imprinted material preparation.

BACKGROUND

Surface molecular imprinting technique establishes the recognition sites on the outer layer and surface of the solid matrix, so that the binding sites are easy to obtain, the migration rate of matters is accelerated, the separation efficiency of imprinted materials is improved, thereby reducing non-specific adsorption and reducing the embedding phenomenon. Drug separation is a hot topic of concern in the pharmaceutical industry and clinical drug analysis, and surface imprinted polymer materials have a broad application prospect in this respect.

Ofloxacin, as the most popular second generation fluoroquinolone broad-spectrum antibiotics, has been widely applied in the treatment of various bacterial infections at present. The levorotatory enantiomer of ofloxacin: S-ofloxacin is yellow or grayish yellow crystalline powder, which is slightly soluble in water and ethyl alcohol, and easily soluble in acetic acid. S-ofloxacin has broad-spectrum antibacterial effect, and the antibacterial efficacy of S-ofloxacin to Gram-negative bacteria and positive bacteria is 8-128 times that of its enantiomer R-ofloxacin. S-ofloxacin prevents the synthesis and replication of bacterial DNA by inhibiting the activity of bacterial DNA gyrase, thus leading to the rapid death of bacteria.

Resolution methods of ofloxacin include high performance liquid chromatography, capillary electrophoresis, co-crystallization, as well as in terms of molecular imprinting, magnetic molecularly imprinted materials and inorganic-organic hybridized molecular imprinting and other imprinting resolution methods.

SUMMARY

The present disclosure is intended to provide a preparation method of AM-type polystyrene microsphere ofloxacin imprinted polymer and an application thereof.

Through molecular design, by mean of the interaction of hydrogen bonds between a functional monomer acrylamide (AM) and a template molecule S-ofloxacin, S-ofloxacin surface imprinted materials are prepared on the surface of polystyrene primary amine microspheres (PSA), and the chiral resolution of ofloxacin is realized by the particularity of void space in the template.

The present disclosure provides a preparation method of AM-type polystyrene microsphere ofloxacin imprinted polymer, in which a monomer acrylamide (AM) and an initiator ammonium persulfate are subjected to graft polymerization on the surface of modified polystyrene primary amine resin, to get grafted particles; then an adsorption test of a levofloxacin solution by the grafted particles PAM/PSA is conducted, and then MIP-PAM/PSA is prepared by using ethylene glycol diglycidyl ether (EGDE) as the crosslinking agent.

The above preparation method specifically includes the following steps:

(1) Activation of Polystyrene Primary Amine Resin Microspheres

Immersing polystyrene primary amine resin microspheres in a N,N-dimethyl formamide solution (DMF) for 6-8 h, washing the microspheres with distilled water sufficiently, and drying in vacuum for 20-28 hours until constant weight, to get activated polystyrene microspheres;

(2) Grafting of AM on Polystyrene Primary Amine Resin Microspheres

Adding 0.3-0.5 g activated polystyrene primary amine resin microspheres into a four-neck flask equipped with an electric stirrer and a reflux condenser, then adding 8-12 mL acrylamide monomer (AM) and a solvent ethyl alcohol, then removing nitrogen, and heating; after reaching 25-35° C., adding an initiator ammonium persulfate, reacting at a temperature condition of 25-35° C. for 6-10 h until termination; washing the microspheres with distilled water repeatedly and drying in vacuum until constant weight.

The reaction principle for the preparation of PAM/PSA is as below:

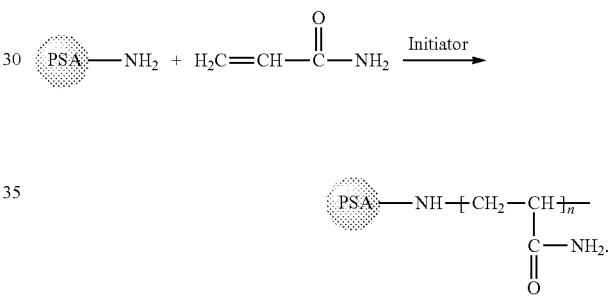

Determination of PAM/PSA Grafting Degree

The grafting profile (mg/g) of the polymer AM on the surface of functional grafted particles PAM/PSA is determined by using a weighing method.

$$GD = \frac{m - m_0}{m_0}$$

In the above formula, $m_0$ (g) is the mass of non-grafted PAM/PSA, m (g) is the mass of grafted PAM/PSA, and GD is grafting degree (mg/g).

(3) Preparation of Surface Molecularly Imprinted Materials:

Grafted particles PAM/PSA will generate strong adsorption to levofloxacin: adsorption equilibrium can be reached within 3 hours, then with the use of a surface imprinting technology, employing saturated adsorption AM grafted polystyrene primary amine resin microspheres, adding an ethyl alcohol solution and 0.005 g/L of levofloxacin solution as the solvent, and adding ethylene glycol diglycidyl ether (EGDE) as the crosslinking agent to successfully prepare a levofloxacin surface molecularly imprinted material MIP-PAM/PSA.

The mechanism for the preparation of the surface imprinted material MIP-PAM/PAS is shown below:

In the above preparation method, firstly, immersing PSA resin with DMF (N—N' dimethyl formamide) so as to activate the groups on the surface of the polymer; in an organic solvent ethyl alcohol, using ammonium persulfate as the initiator, grafting a functional monomer acrylamide (AM) onto polystyrene primary amine resin microspheres through free radical polymerization; and detecting the characteristics of the grafted particles by using Fourier transform infrared spectroscopy (FTIR). The optimum preparation conditions for the preparation of PAM/PAS are: the temperature is 30° C.; the solvent is ethyl alcohol; the amount of the monomer AM is 11.01% (mass fraction of the solution); the initiator accounts for a mass fraction of 8.80% in the monomer, and then graft polymerization and reaction for 8 h; the grafting degree is 47.69 g/100 g.

During the adsorption of levofloxacin by the above grafted particles PAM/PSA, a hydrogen-bond interaction will be generated between the grafted polymer PAM and the hydroxyl groups in the polymer chain of levofloxacin in a non-aqueous media. Under such an interaction, the grafted particles PAM/PSA will generate strong adsorption to ofloxacin: adsorption equilibrium can be reached within 3 hours, the optimal adsorption temperature is 35° C.; when the adsorptive pH=3, the maximal adsorption capacity is 113 mg/g. The prepared molecularly imprinted polymer is characterized by Fourier transform infrared spectroscopy (FTIR).

The present disclosure further provides the recognition performance of levofloxacin imprinted polymer MIP-PAM/PSA which is used as the template molecule.

The levofloxacin surface imprinted material has good recognition selectivity. In addition, the main factors affecting the selectivity of the imprinted material are tested: the amount of the crosslinking agent EGDE is 0.3 ml, when the temperature is 30° C., the optimal adsorption capacity is: 118 mg/g, and it has a good recognition selectivity.

The present disclosure has the following beneficial effects: The present disclosure can realize the separation and purification of racemic ofloxacin effectively, thus providing a new method and material for separating and enriching s-type ofloxacin in the industry. Because the antibacterial efficacy of S-ofloxacin on Gram-negative bacteria and positive bacteria is 8-128 times that of its enantiomer R-ofloxacin, so the present technology can improve the efficacy of a drug greatly.

DETAILED DESCRIPTION

The present disclosure will be further illustrated through the following examples, but not limited to these examples.

Example 1: Preparation Process of Grafted Particles PAM/PSA

The following steps are included:
(1) Activation of Polystyrene Microspheres

Figure 6:
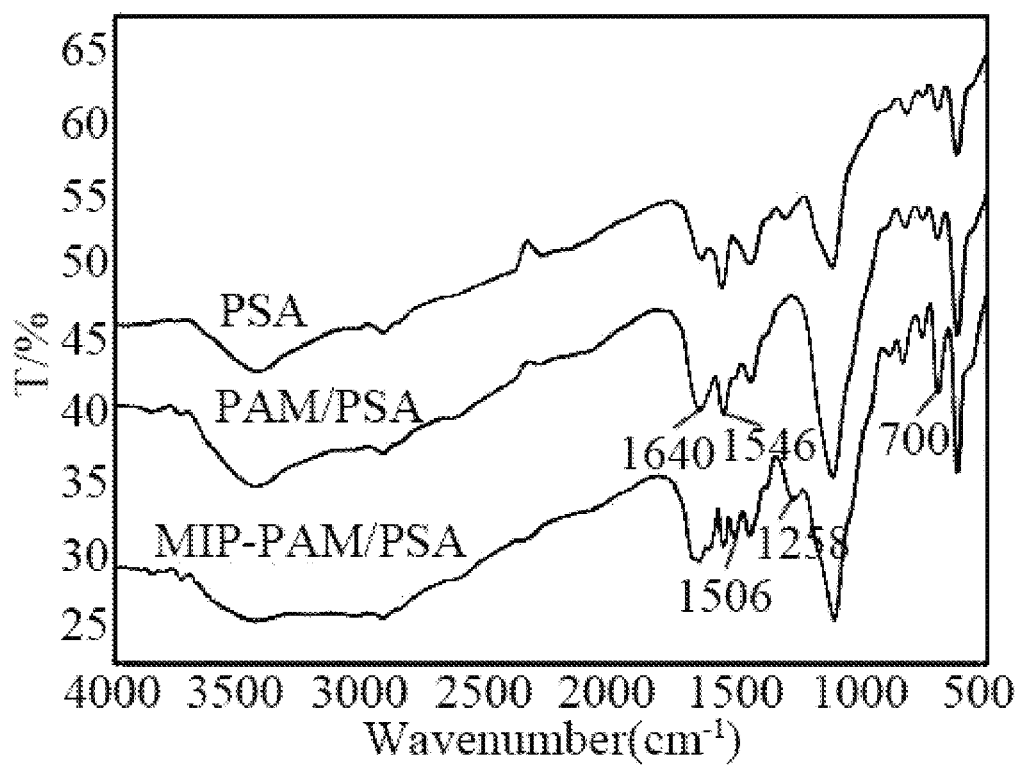
FIG. 6 is an infrared spectrogram of PSA, PAM/PSA, and MIP-PAM/PSA.

Immersing polystyrene primary amine resin microspheres in a N,N-dimethyl formamide solution (DMF) for 6-8 h, washing the microspheres with distilled water sufficiently and suction filtering, and drying in vacuum for 20-28 hours until constant weight, to get polystyrene primary amine resin microspheres with many activated amino groups on the surface;
(2) Grafting of Acrylamide on the Polystyrene Primary Amine Resin Microspheres Adding 0.3-0.5 g activated polystyrene primary amine resin microspheres into a four-neck flask equipped with an electric stirrer and a reflux condenser, then adding 8-12 mL acrylamide monomer (AM) which accounts for a mass fraction of 10-12% in the solution and 40-60 ml ethyl alcohol solvent, then introducing nitrogen for 26-32 min to remove the air in the reaction system, heating to 30° C. and then adding 0.3-0.5 g ammonium persulfate initiator, reacting at a constant temperature condition for 6-10 h until termination; washing the microspheres with distilled water repeatedly and suction filtering, then drying for 22-26 h in vacuum until constant weight, to get functional grafted particles PAM/PSA.
(3) Characterization of Grafted Particles PAM/PSA Ø The infrared absorption spectrum was detected by using the KBr pellet method, as shown in FIG. 6.

Ø The grafting degree of PAM/PSA was calculated following the formula below.

$$GD = \frac{m - m_0}{m_0}$$

In the above formula, $m_0$ (g) is the mass of non-grafted PAM/PSA, m (g) is the mass of grafted PAM/PSA, and GD is grafting degree (mg/g).

The effects of solvents, temperature (° C.), the amount of acrylamide (AM) and the amounts of the initiator ammonium persulfate were studied in this example. The experiments were conducted by using a variable-controlling approach to explore and determine the most suitable reaction conditions. The reaction mechanism of grafting PAM/PSA was studied.
1. Taking the Solvent as the Variable Effect of Different Solvents on the Grafting Degree 0.4 g activated polystyrene primary amine resin microspheres were weighed into several 100 ml four-neck flasks, into which were added 10 mL of monomer acrylamide (AM) which accounts for a mass fraction of 11.01% in the solution respectively, and further respectively added 50 mL of solvents which were water, ethyl alcohol: water of 1:1, ethyl alcohol, dimethyl sulfoxide, and 1,2-dichloroethane. The reaction temperature was set at 40° C. The air in the reaction system was purged with nitrogen for 30 min. 0.4 g of the initiator ammonium persulfate was additionally added and reacted for 8 hours until the reaction was terminated. The materials in the flasks were washed and suction filtered, dried in a vacuum drying oven for 24 hours.

Figure 1:
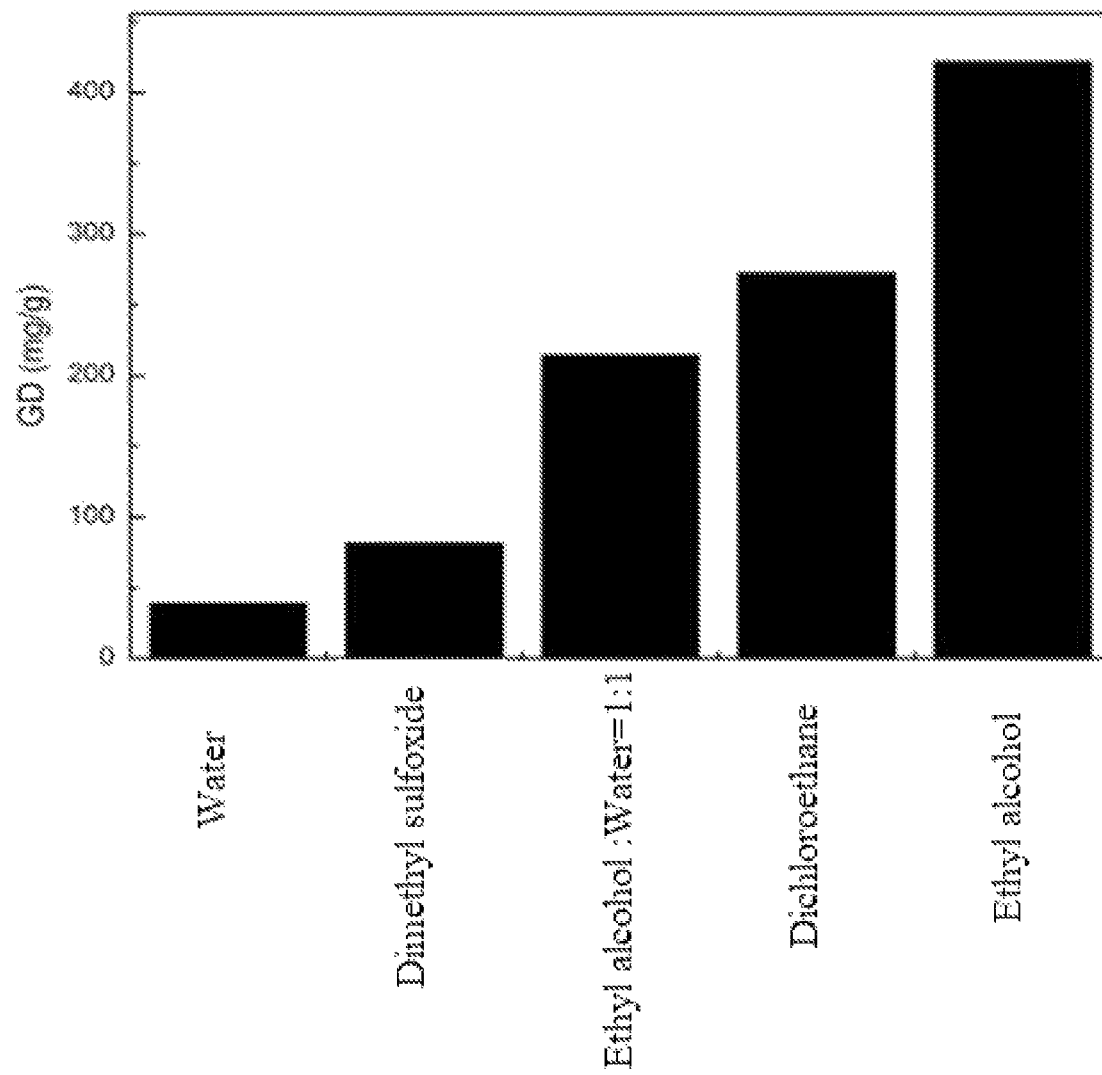
FIG. 1 shows the grafting degrees of grafted particles PAM/PSA prepared in different solvents.

The grafting degrees of grafted particles PAM/PSA prepared in different solvents were determined and compared, defining that the optimum solvent was ethyl alcohol. As shown in FIG. 1. It can be known from the experimental data in FIG. 1 that, when other conditions are all the same, the grafting degree was the highest when ethyl alcohol was used as the solvent, for which the reason may be due to the hydrogen-bond interaction between the carboxyl groups in ethyl alcohol and grafted particles as well as electrostatic interaction, however, the hydrogen-bond interaction in other solvents such as water, dimethyl sulfoxide, 1,2-dichloroethane was little, thereby defining that ethyl alcohol was the optimum solvent.
2. Effect of the Amount of Monomer on the Grafting Degree 0.4 g activated polystyrene primary amine resin microspheres were respectively weighed into several 100 ml four-neck flasks, into which were added 10 mL monomer acrylamide (AM) of 4.10%, 6.47%, 8.77%, 11.01%, 13.19% (mass fractions in the solution) respectively and 50 mL of ethyl alcohol solvent. The reaction temperature was set at 30° C. The air in the reaction system was discharged by introducing nitrogen for 30 min. 0.4 g of the initiator ammonium persulfate was additionally added and reacted for 8 h until the reaction was terminated. The materials in the flasks were washed and suction filtered, dried in a vacuum drying oven for 24 h.

Figure 2:
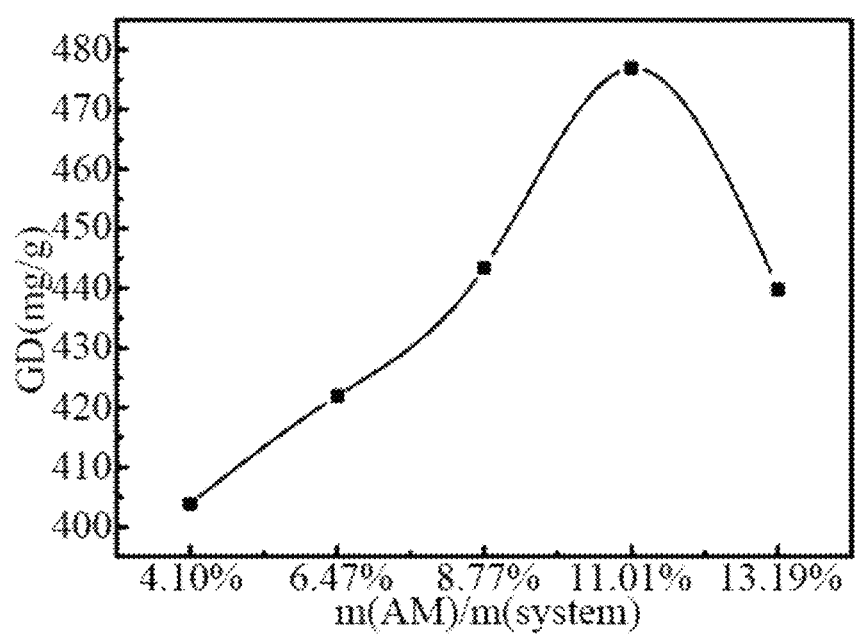
FIG. 2 shows the grafting degrees of grafted particles PAM/PSA prepared with different amounts of monomer.

The grafting degrees of grafted particles PAM/PSA prepared with different amounts of monomer were determined and compared to obtain the optimum amount of monomer. It can be known from FIG. 2 that, when other conditions are all the same, the grafting degree increased slowly with the increase of the mass fraction of monomer in the solution firstly, reached a maximum when reacting to a certain degree, and then decreased. When the mass fraction of AM was 11.01% (percentage of solution mass), the grafting degree reached a maximum: 476.89 mg/g. The reason was that there were a certain number of amino groups in the system, but with the increase of monomer mass (the increase of substrate concentration), the grafting rate increased; when the mass fraction of AM increased to 11.01%, the graft polymerization became too fast, resulting in that: (1) amino groups on the primary amine resin became less, (2) the resulting polymers formed a dense barrier layer on the surface of the primary amine resin, thus slowing down the reaction rate and making the grafting degree to be smaller.

3. Effect of the Amount of Initiator on the Grafting Degree 0.4 g activated polystyrene primary amine resin microspheres were respectively weighed into several 100 ml four-neck flasks, into which were added 10 mL of monomer acrylamide (AM) which accounts for a mass fraction of 11.01% in the solution and 50 mL of ethyl alcohol solvent respectively. The reaction temperature was set at 30° C. The air in the reaction system was discharged by introducing nitrogen for 30 min. 0.1 g (2.04% of the monomer mass), 0.2 g (4.09% of the monomer mass), 0.3 g (6.14% of the monomer mass), 0.4 g (8.18% of the monomer mass), and 0.5 g (10.23% of the monomer mass) initiator ammonium persulfate was further added respectively and reacted for 8 h until the reaction was terminated. The materials in the flasks were washed and suction filtered, dried in a vacuum drying oven for 24 h.

Figure 3:
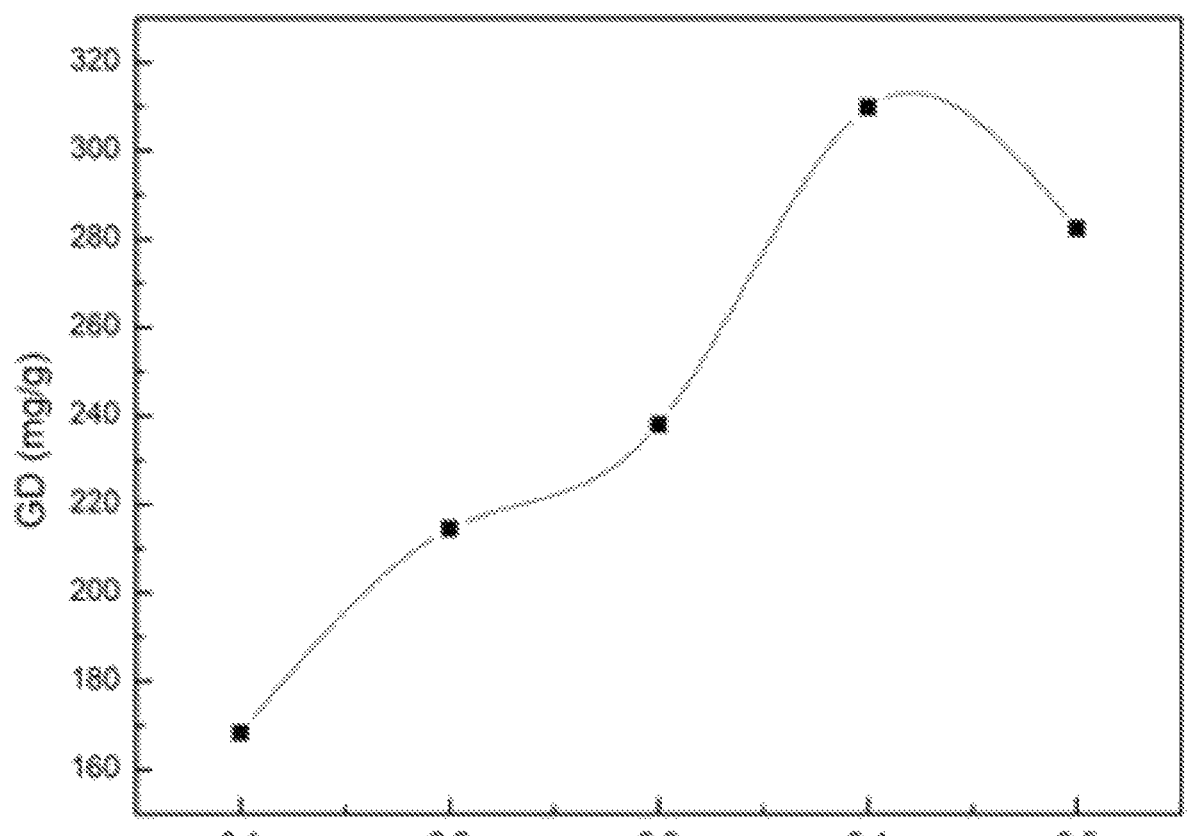
FIG. 3 shows the grafting degrees of grafted particles PAM/PSA prepared with different amounts of initiator.

The grafting degrees of grafted particles PAM/PSA prepared with different amounts of initiator were determined and compared to obtain the optimum amount of initiator. As shown in FIG. 3, with the increase of the mass of initiator ammonium persulfate, the grafting degree increased firstly and then decreased. When the mass of ammonium persulfate was 0.43 g (8.80% of the monomer mass), the maximal grafting degree was 310.79 mg/g. The reasons may be: (1) PAM macromolecular chains grafted onto the primary amine microspheres at first were interwoven, so as to form a dense polymer barrier layer on the surface of the primary amine resin, thus slowing down the polymerization rate. When the mass fraction of persulfates exceeded 8.80%, the polymerization rate became too fast, thereby a dense barrier layer would be formed on the surface of the primary amine resin in a short time, thus hindering the graft polymerization of AM, and further slowing down the grafting rate and making the grafting degree to be smaller. (2) Excessive amount of initiator would accelerate the homopolymerization between AM monomers and slow down the graft polymerization rate between AM monomers and primary amine microspheres.

Example 2

Adsorption Experiment of Levofloxacin Solution by Grafted Particles PAM/PSA

1. Determination of Levofloxacin Standard Curve

A levofloxacin solution of 0.1 g/L was accurately formulated in a 100 ml volumetric flask. 0.25, 0.50, 0.75, 1.00, 1.25, 1.50, 1.75 mL of the levofloxacin solution at 0.1 g/L were respectively pipetted into 100 mL volumetric flasks, and metered with ethyl alcohol solvent. That is, the levofloxacin solution was diluted into solutions with a concentration gradient of 0.001, 0.002, 0.003, 0.004, 0.005, 0.006, 0.007 g/L. The absorbance of various solutions was determined at a wavelength of 299.0 nm with ethyl alcohol as the reference solution. A relationship curve between absorbance A and C (C represented the concentration of levofloxacin) was plotted to obtain the standard curve of the levofloxacin solution, as shown in FIG. 4.

Figure 4:
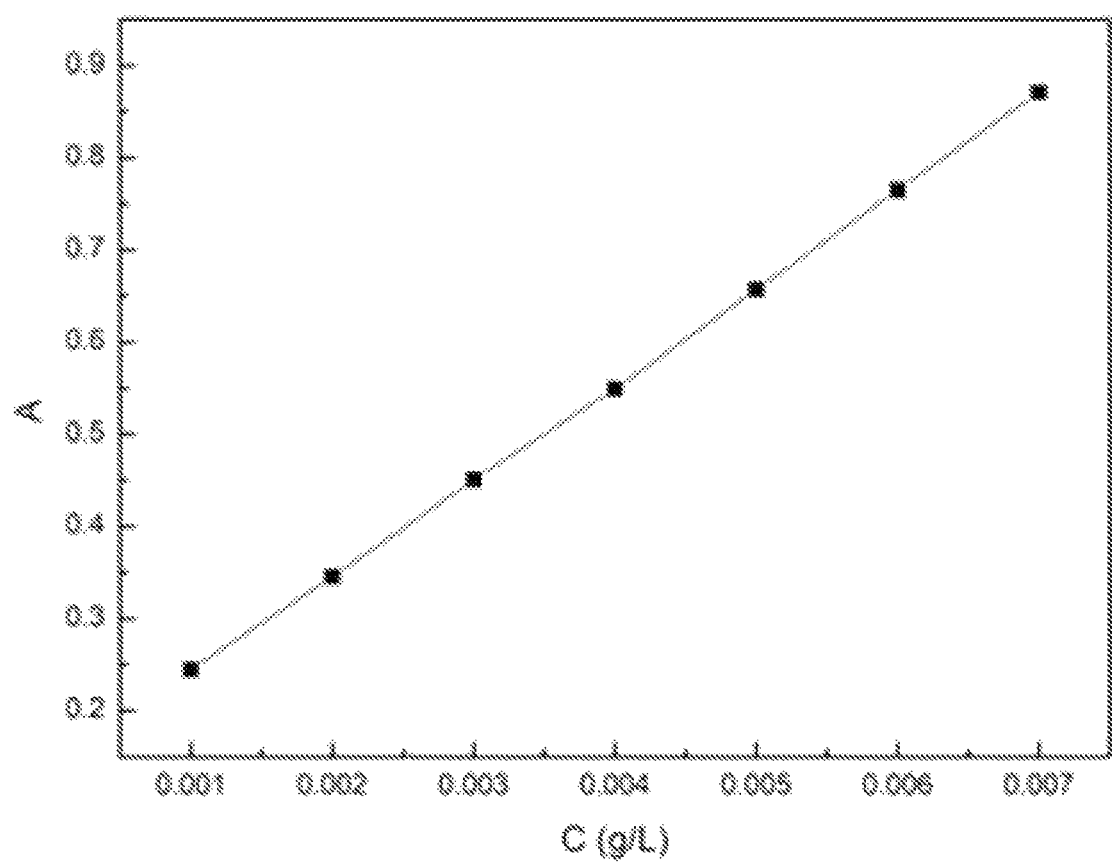
FIG. 4 is a standard curve of the solution of levofloxacin in ethyl alcohol.

FIG. 4 is a standard curve of the solution of levofloxacin in ethyl alcohol: after linear fitting, the relevance R2=0.9998, and the linear equation is: A=104.41C+0.137. According to this formula in combination with the computational formula of adsorption capacity, the adsorption capacity of levofloxacin molecules by the imprinted material MIP-PAM/PSA can be calculated.

2. Determination of PAM/PSA Adsorption Kinetic Curve 0.05 g grafted particles PAM/PSA were respectively weighed into two 50 ml conical flasks. 25 ml of the formulated solution at 0.004 g/L was accurately pipetted into the two conical flasks containing grafted particles respectively, and additionally 25 ml of the solution at 0.004 g/L was pipetted into two empty conical flasks respectively. The four conical flasks were sealed, placed in a thermostatic oscillator and shaken at a constant temperature of 30° C. The conical flasks were taken out after 0.5 h, and left for centrifugation. The supernatants were taken and the ultraviolet absorption intensities were determined respectively, which were marked as adsorption A and control A respectively. The concentrations were calculated respectively according to the standard curve equation and the adsorption capacity was calculated following the formula below:

$$Qe = \frac{V(C_0 - C_t)}{m}$$

In the above formula, Qe (mg/g) is the equilibrium adsorption capacity of levofloxacin by the adsorption material grafted particles PAM/PSA; V (mL) is the defined volume of the levofloxacin solution. Co (g/L) is the initial concentration of the levofloxacin solution. Ce (g/L) is the concentration of levofloxacin in the supernatant after adsorption equilibrium. m (g) is the mass of the selected grafted particles PAM/PSA.

As above, the conical flasks were taken out after 1 h, 1.5 h, 2 h, 2.5 h, 3 h, 3.5 h, and 4 h respectively, and left to take the supernatants. The ultraviolet absorption intensities were detected, corresponding concentrations and adsorption capacities were calculated and an adsorption kinetic curve was plotted to get the optimal adsorption time.

Figure 5:
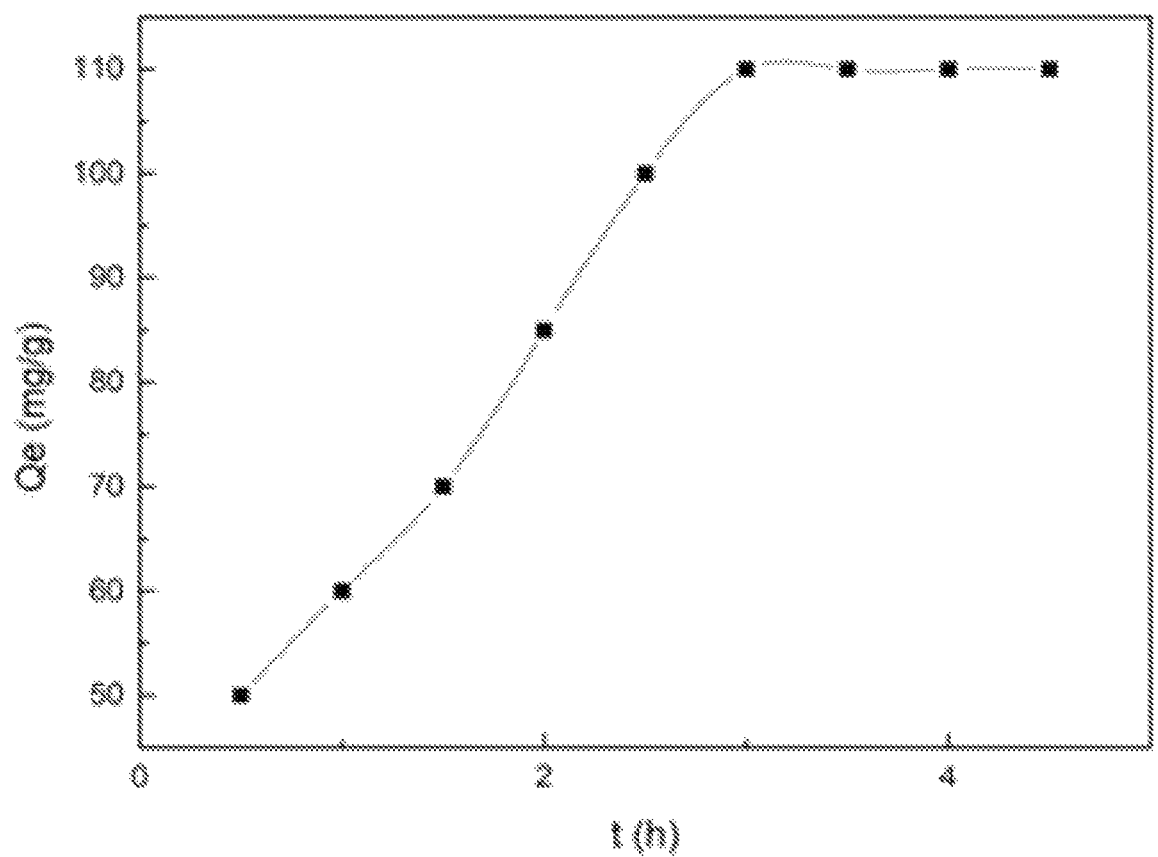
FIG. 5 is an adsorption kinetic curve of the adsorption of levofloxacin by functional grafted particles PAM/PSA.

It can be seen from FIG. 5 that, the adsorption capacity of levofloxacin by functional grafted particles PAM/PSA increased with the increase of time. When the reaction time reached 3 h, the adsorption capacity was balanced basically with fluctuations in a small range, indicating that adsorption equilibrium had been achieved. The adsorption saturation time was 3 h, and the saturation adsorption capacity was about 110 mg/g.

3. Determination of PAM/PSA Adsorption Isothermal Curve 0.5, 0.75, 1, 1.25, 1.5, 1.75, 2, and 2.25 mL of the formulated levofloxacin solution at 0.1 g/L were accurately pipetted into volumetric flasks of 100 mL respectively, and metered with an ethyl alcohol solvent. That is, the levofloxacin solution was diluted into solutions with a concentration gradient of 0.002, 0.003, 0.004, 0.005, 0.006, 0.007, 0.008 g/L, 25 ml of which respectively was accurately pipetted into 7 conical flasks of 50 ml containing 0.05 g grafted particles PAM/PSA respectively, and the remaining solutions were all poured into 7 empty conical flasks respectively and attached with corresponding tags, then sealed and shaken at a constant temperature of 30° C. for adsorption. After 3 h, they were all taken out and left for centrifugation. The supernatants were taken and the ultraviolet absorption intensities were determined respectively. The corresponding concentrations and adsorption capacities were calculated according to the formula and an adsorption isothermal curve was plotted to obtain the optimal adsorption concentration.

The results showed that: the adsorption of levofloxacin by grafted particles PAM/PSA increased with the increase of levofloxacin concentration, and such an adsorption mainly derived from the hydrogen-bond interaction between grafted particles and levofloxacin as well as electrostatic interaction. When the concentration reached 0.005 g/L, adsorption equilibrium was achieved, and the adsorption capacity was 113 mg/g. After activation of PAM/PSA, the electronegativity of amino groups was great, and hydrogen-bond interaction may be generated between the amino groups and the hydrogen atoms of hydroxyl groups; at the same time, the electronegativity of nitrogen in the grafted compounds was smaller than that of oxygen, exhibiting positive charges, while part of carboxyl groups carried negative charges after ionization, so electrostatic interaction would be generated.

4. Effect of the Temperature on the Adsorption of Levofloxacin During Adsorption 0.05 g PAM/PSA grafted particles were respectively weighed into two conical flasks of 50 ml. 1.25 ml of the formulated levofloxacin solution at 0.1 g/L was accurately pipetted into volumetric flasks of 25 mL respectively, and metered with an ethyl alcohol solvent. The levofloxacin solution was diluted into solutions with a concentration gradient of 0.002, 0.003, 0.004, 0.005, 0.006, 0.007, 0.008 g/L, 25 ml of which was accurately pipetted into conical flasks of 50 ml containing 0.05 g grafted particles PAM/PSA respectively, and then 25 ml of the solution was pipetted into an empty conical flask. All the conical flasks were attached with corresponding tags, then sealed and shaken at constant temperatures of 20, 30, 40, 50, 60° C. for adsorption. After 3 h, they were all taken out and left for centrifugation. The supernatants were taken and the ultraviolet absorption intensities were determined respectively. The corresponding concentrations and adsorption capacities were calculated according to the formula of adsorption capacity, and adsorption curves at different temperatures were plotted to obtain the optimal adsorption temperature.

The results showed that: the adsorption of levofloxacin by functional grafted particles PAM/PSA increased firstly and then decreased with the increase of temperature. As we have discussed earlier, the acting forces affecting the adsorption of levofloxacin by grafted particles PAM/PSA mainly derived from the hydrogen-bond interaction between grafted particles and levofloxacin as well as electrostatic interaction. However, either the electrostatic interaction or the hydrogen-bond interaction was chemical adsorption, which was generally an exothermic process. At temperatures lower than 35° C., the temperature of the system was low, the adsorption capacity showed an increasing trend; while when the temperatures were higher than 35° C., the adsorption capacities were reduced due to the temperature of the reaction and the exothermic effect of the reaction itself. Therefore, we can see that the acting force between PPAM/PSA particles and levofloxacin molecules was the strongest at 35° C., and the maximal adsorption capacity was 102.5 mg/g.

5. Effect of PH on the Adsorption of Levofloxacin by Grafted Microspheres PAM/PSA 0.05 g grafted particles PAM/PSA were respectively weighed into 6 conical flasks of 50 ml, which were attached with tags marked as Nos. 1, 2, 3, 4, 5, 6. Additional 6 conical flasks were taken and attached with tags marked as Original Nos. 1, 2, 3, 4, 5, 6. Then 3 mL of the formulated levofloxacin solution at 0.005 g/L was added into 6 volumetric flasks of 25 mL respectively, and metered with disodium hydrogen phosphate-citrate buffer solutions at pH 2.2, 3, 4, 5, 6 to volume respectively, 25 ml of which was respectively added into corresponding conical flasks, then sealed and shaken at a constant temperature of 30° C. for adsorption. After 3 h, they were all taken out and left for centrifugation. The supernatants were taken and the ultraviolet absorption intensities were determined respectively. The corresponding concentrations and adsorption capacities were calculated according to the formula of adsorption capacity, and the effect of PH on the adsorption of levofloxacin by grafted microspheres PAM/PSA was investigated.

The results showed that: the adsorption of levofloxacin by functional grafted particles PAM/PSA increased firstly and then decreased with the increase of pH. The adsorption capacity reached a maximum of 100 mg/g when pH was 3. Firstly as we know, with the increase of pH, the ionization degree of carboxyl groups in levofloxacin increases, so the acting force between grafted particles and levofloxacin also increases. However, there is also hydrogen-bond interaction between them. When PH<3, the ionization degree of carboxyl groups in levofloxacin is very small, so the main acting force between them to consider is the hydrogen-bond interaction. When PH>3, the hydrogen-bond interaction decreases, the adsorption between them decreases, thus the equilibrium adsorption capacity decreases too.

Example 3: Preparation of Levofloxacin Surface Imprinted Materials MIP-PAM/PSA

The optimal conditions for the adsorption of levofloxacin by grafted particles PAM/PSA can be known from the previous exploration results, thereby producing saturated adsorption grafted particles PAM/PSA. On basis of this, an imprinted polymer material MIP-PAM/PSA can be prepared, specifically including the following steps:

(1) Preparation of a Levofloxacin Surface Imprinted Material MIP-PAM/PSA 0.4 g activated polystyrene primary amine resin microspheres PSA which have been immersed, 50 ml of a solution of levofloxacin in ethyl alcohol at 0.005 g/L, 10 ml acrylamide monomer of 11.01% (mass fraction of the solution), and 0.4 g the initiator ammonium persulfate were placed in a four-neck flask, into which was added 0.3 ml the crosslinking agent EGDE. The air in the system was discharged by introducing nitrogen for 30 min. The materials in the four-neck flask were stirred at a temperature condition of 30° C. for 6 hours. Upon the completion of the reaction, 10 ml acetic acid and 40 ml methyl alcohol were added and stirred at a constant temperature for 3 hours to wash off the levofloxacin template. They were dried in a vacuum drying oven for 8 hours to get the levofloxacin surface molecularly imprinted material MIP-PAM/PSA.

(2) Characterization of the Levofloxacin Surface Imprinted Material MIP-PAM/PSA

The infrared absorption spectrum was detected by using the KBr pellet method, from which various functional groups contained in the material were observed to determine whether the crosslinking was successful. FIG. 6 is the infrared spectrogram of PSA, PAM/PSA, and MIP-PAM/PSA, from which it can be seen that 1560-1650 cm$^{-1}$ is the absorption peak of —NH$_2$ group. 1700 cm$^{-1}$ is the characteristic peak of carbonyl group in AM. Thus it can be seen that AM was grafted onto primary amine resin microspheres. However, 2850-2930 cm$^{-1}$ is the characteristic peak of methylene. 1470 cm$^{-1}$ shows the in-plane bending of carbon-hydrogen, 1600-1700 cm$^{-1}$ represents the amido linkage, 1400 cm$^{-1}$ is the characteristic peak of carbon-nitrogen stretching amide, which are the main groups in the imprinted material. It thus suggested that the imprinted material MIP-PAM/PSA has been produced successfully.

The effects of various factors in the preparation of the imprinted material were studied below.

1. Effect of the Amount of the Crosslinking Agent on the Synthesis of the Imprinted Material 0.3-0.5 g activated polystyrene primary amine resin microspheres were weighed into several 100 ml four-neck flasks respectively, into which were added 8-12 mL of the monomer and levofloxacin solutions of 0.004-0.006 g/L with 45-55 ml ethyl alcohol as the solvent, and further weighed 0.05-0.4 ml of the crosslinking agent EGDE. The reaction temperatures were set at 25-35° C. The air in the reaction system was purged by introducing nitrogen for 25-35 min. 0.3-0.5 g ammonium persulfate was then added and reacted for 4-8 hours with stirring. Upon the completion of the reaction, 8-12 ml acetic acid and 35-45 ml methyl alcohol were added and stirred at a constant temperature for 2-4 hours to wash off the levofloxacin template, and then suction filtered and dried.

0.04-0.06 g of the imprinted materials MIP-PAM/PSA were respectively weighed into 5 conical flasks of 50 ml, which were attached with tags marked as Nos. 1, 2, 3, 4, 5. Additional 5 conical flasks were taken as blank controls. Then the formulated levofloxacin solutions at 0.004-0.006 g/L were added into 10 conical flasks respectively, then sealed and shaken at a constant temperature of 30-40° C. for adsorption. After 4-6 h, they were all taken out and left for centrifugation. The supernatants were taken and the ultraviolet UV absorption intensities were determined respectively. The corresponding concentrations and adsorption capacities were calculated according to the formula 2.2, and the effect of the amount of the crosslinking agent on the adsorption of levofloxacin by the imprinted materials was investigated.

Figure 7:
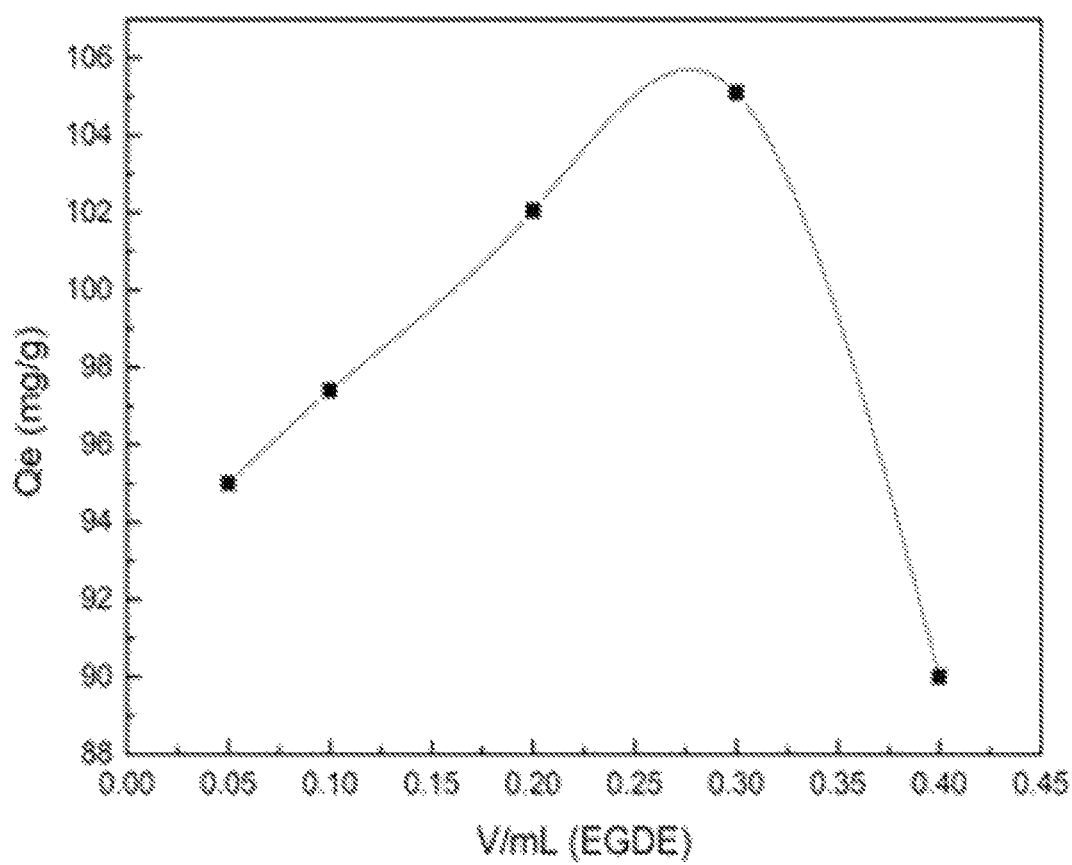
FIG. 7 is a diagram showing the adsorption capacity Qe of the imprinted polymer MIP-PAM/PSA as a function of the amount of the crosslinking agent.

As shown in FIG. 7, the adsorption capacity Qe of the imprinted polymer MIP-PAM/PSA increased firstly and then decreased with the increase of the amount of the crosslinking agent. When the amount of the crosslinking agent was 0.3 mL, the adsorption capacity reached a maximum of 105 mg/g. When the amount of the crosslinking agent was less than 0.3 ml, the recognition capability of the imprinted polymer was reduced because its cavities cannot be kept stably. When the amount of the crosslinking agent was greater than 0.3 ml, the imprinting effect would be destroyed, thus reducing the specific recognition sites of the imprinted polymer. Therefore, after the amount of the crosslinking agent reached 0.3 mL, the adsorption capacity decreased with the increase of the amount of the crosslinking agent. It can be known from the experiments that the optimal amount of the crosslinking agent for imprinting synthesis was 0.3 mL.

2. Effect of Temperature on Imprinting Synthesis 0.3-0.5 g activated polystyrene primary amine resin microspheres were weighed into several 100 ml four-neck flasks respectively, into which was added 8-12 mL of the monomer, levofloxacin solutions of 0.004-0.006 g/L with 45-55 ml ethyl alcohol as the solvent, and 0.3 ml of the crosslinking agent EGDE. The reaction temperatures were set at 20, 30, 40, 50, 60° C. The air in the reaction system was purged by introducing nitrogen for 20-40 min. 0.3-0.5 g ammonium persulfate was then added and reacted for 4-8 hours with stirring respectively. Upon the completion of the reaction, 8-12 ml acetic acid and 35-45 ml methyl alcohol were added and stirred at a constant temperature for 2-4 h to wash off the levofloxacin template, and then suction filtered and dried for 8-10 h.

0.03-0.06 g of the imprinted materials were respectively weighed into 5 conical flasks of 50 ml, which were attached with tags marked as Nos. 1, 2, 3, 4, 5. Additional 5 conical flasks were taken as blank controls. Then the formulated levofloxacin solutions at 0.005 g/L were added into 10 conical flasks respectively, then sealed and shaken at a constant temperature of 30-40° C. for adsorption. After 2-4 h, they were all taken out and left for centrifugation. The supernatants were taken and the ultraviolet UV absorption intensities were determined respectively. The corresponding concentrations and adsorption capacities were calculated according to the formula of adsorption capacity, and the effect of temperature on the adsorption of levofloxacin by the imprinted materials was investigated.

Figure 8:
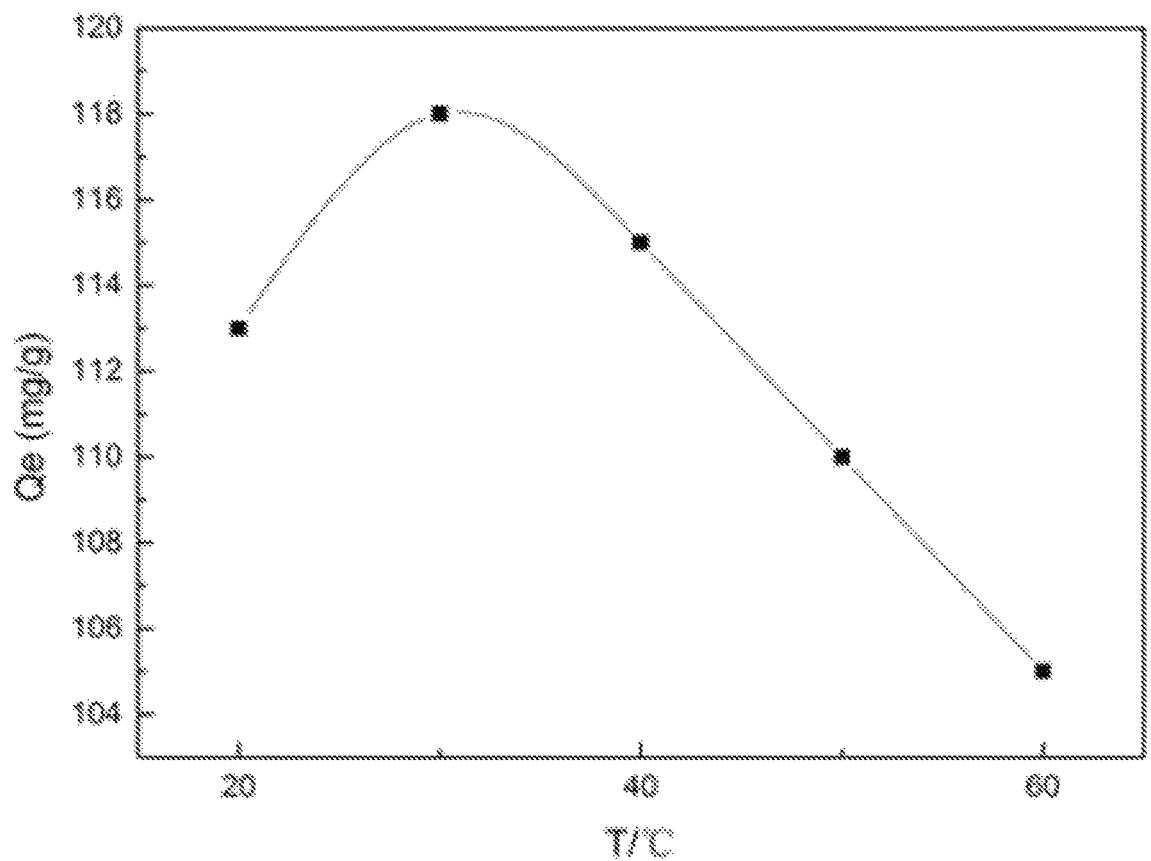
FIG. 8 is a diagram showing the adsorption capacity Qe of the imprinted polymer MIP-PAM/PSA as a function of temperature

As shown in FIG. 8, the adsorption capacity Qe of the imprinted polymer MIP-PAM/PSA increased firstly and then decreased with the increase of temperature. When the temperature was 30° C., the adsorption capacity reached a maximum of 118 mg/g. When the temperature was lower, the initiation step was slow, and the number of free radicals on the surface of polystyrene primary amine microspheres was less; when the temperature increased, the initiation became faster. However, because both the electrostatic interaction and the hydrogen-bond interaction were mostly exothermic reactions, so it is not conducive to continue the reaction with the increase of the reaction temperature. Therefore, when the temperature was greater than 30° C., the grafting degree of the grafted spheres decreased with the increase of the temperature.

Example 4

Studies on the Recognition Performance of Levofloxacin by the Imprinted Material MIP-PAM/PSA 1. Determination of Adsorption Isotherms 0.50, 0.75, 1.00, 1.25, 1.50, 1.75, 2.00 mL of the formulated levofloxacin solution at 0.05-0.15 g/L were accurately pipetted into 25 mL volumetric flasks respectively, and metered with an ethyl alcohol solvent. That is, the levofloxacin solution was diluted into solutions with a concentration gradient of 0.002, 0.003, 0.004, 0.005, 0.006, 0.007 g/L, 25 ml of which was accurately pipetted into 6 conical flasks of 50 ml containing 0.05-0.15 g the imprinted material MIP-PAM/PSA respectively, and 20-30 ml of the solution was poured into 6 empty conical flasks respectively and attached with corresponding tags, then sealed and shaken at a constant temperature of 30-40° C. for adsorption. After 2-4 h, they were all taken out and left for centrifugation. The supernatants were taken and the ultraviolet absorption intensities were determined respectively. The corresponding concentrations and adsorption capacities were calculated according to the formula of adsorption capacity. The above experiments were conducted on ofloxacin with other conditions unchanged, and the isothermal bonding line of the two materials was plotted.

Figure 9:
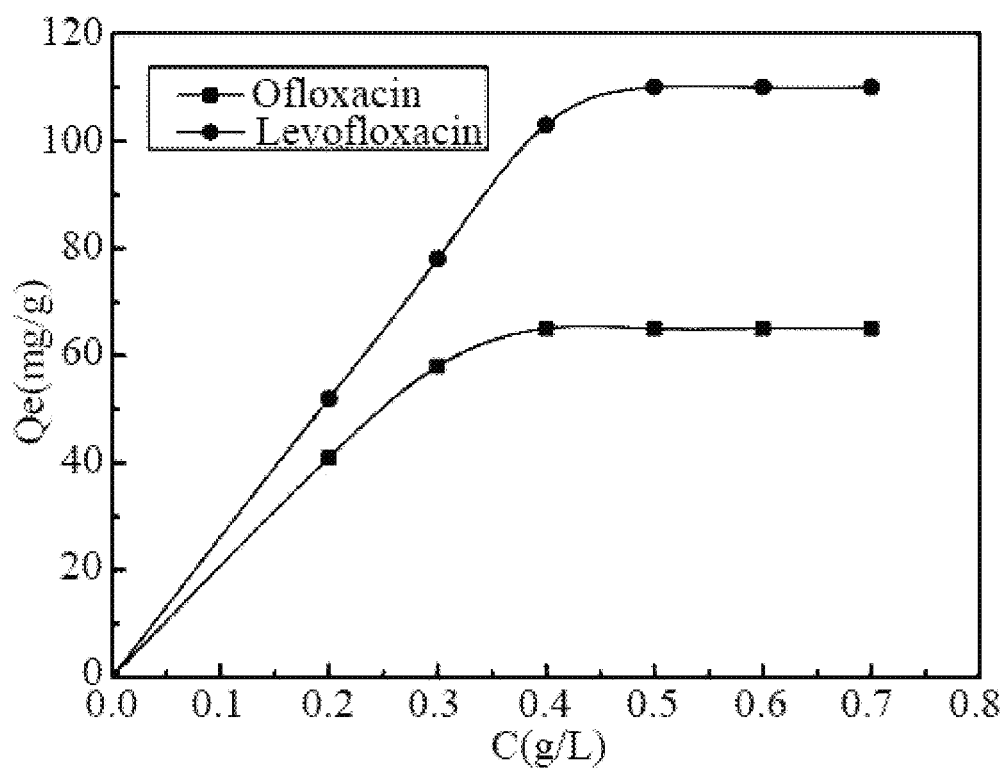
FIG. 9 is a diagram showing the adsorptions of levofloxacin and ofloxacin by the imprinted material MIP-PAM/PSA.

FIG. 9 shows the adsorptions of levofloxacin and ofloxacin by the imprinted material MIP-PAM/PSA, suggesting that the imprinted material MIP-PAM/PSA had good binding capability and recognition selectivity on the template molecules. This is because only the imprinted molecules are consistent with many three-dimensional imprinted holes formed by levofloxacin in terms of spatial structure and action sites.

Figure 10:
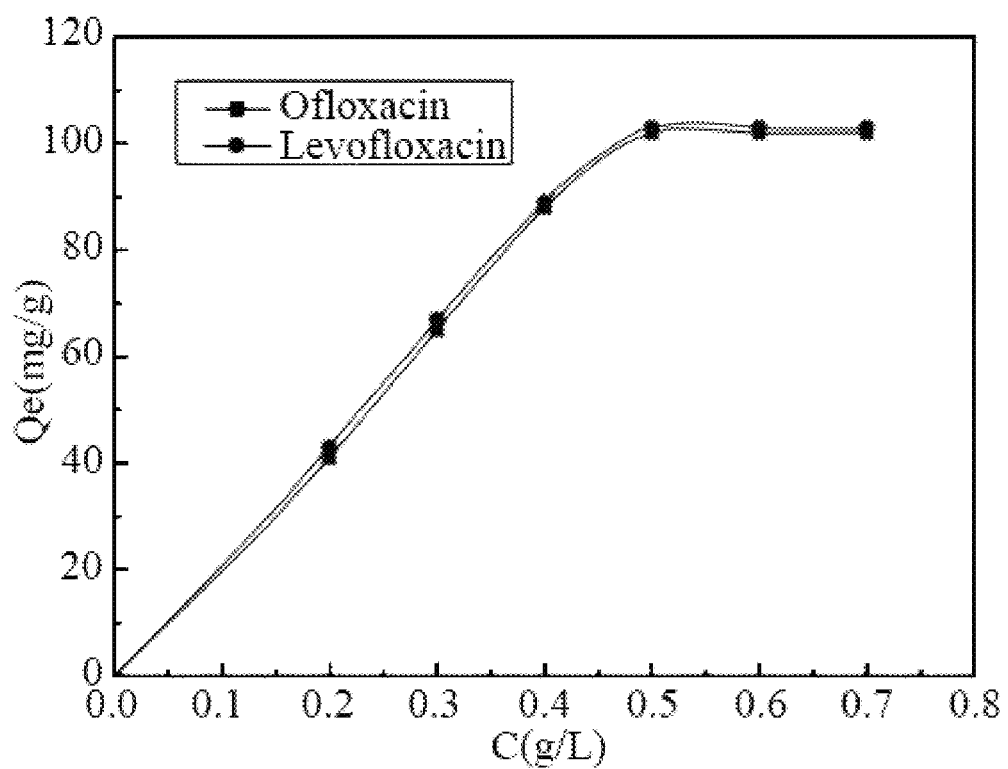
FIG. 10 is a diagram showing the adsorptions of ofloxacin and its single enantiomer by the non-imprinted material NMIP-PAM/PSA.

FIG. 10 shows that the adsorption capacities of levofloxacin and ofloxacin by the non-imprinted material NMIP-PAM/PSA are comparative, suggesting that the non-imprinted material NMIP-PAM/PSA has no recognition selectivity on ofloxacin and its single enantiomer.

2. Study on the Properties of the Imprinted Polymer MIP-PAM/PSA for Repeated Use After eluting the imprinted polymer MIP-PAM/PSA with ethyl alcohol for several times, its adsorption capacity was determined, thereby determining the properties of PAM/PSA for being repeatedly used in the adsorption of levofloxacin.

Figure 11:
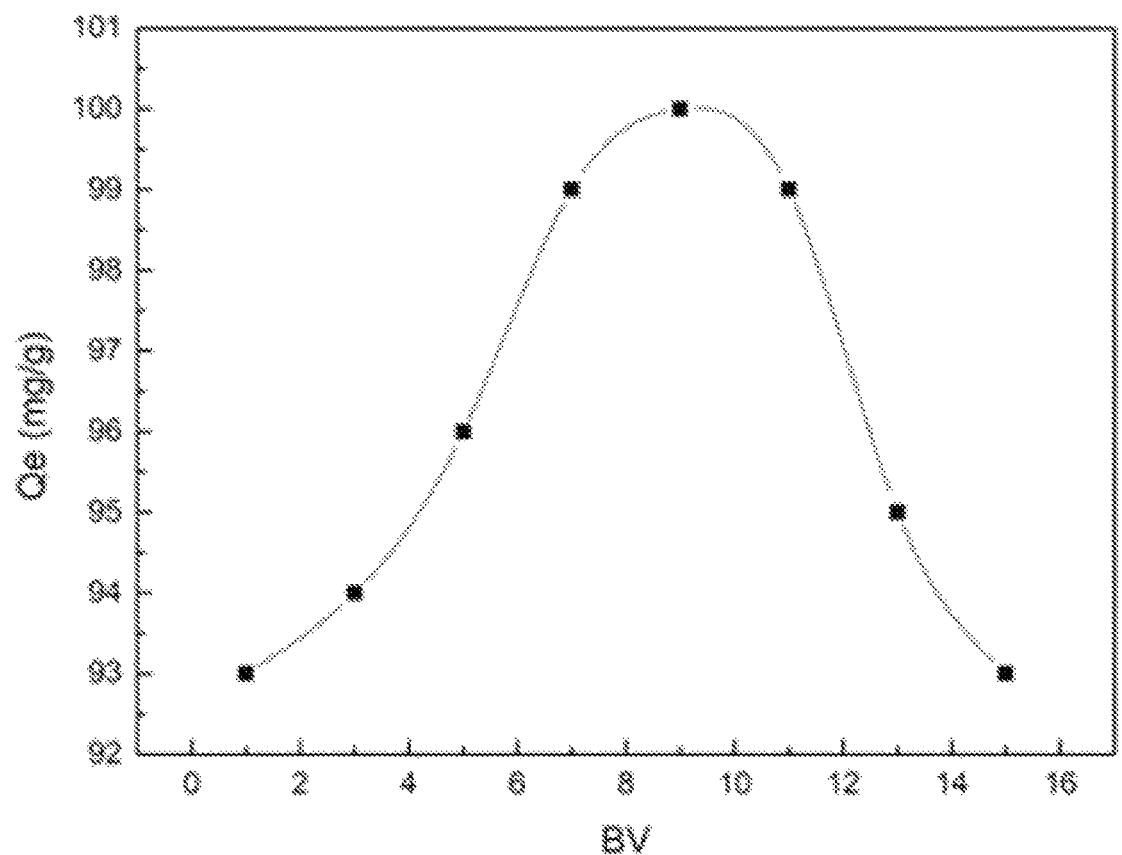
FIG. 11 shows the reuse effect of the imprinted polymer MIP-PAM/PSA in the adsorption of levofloxacin.

It can be seen from FIG. 11 that, after elution for multiple times, the adsorption capacity of PAM/PSA was 70 mg/g, suggesting that it has a good reusability, and the reuse rate reached 93%.

What is claimed is:

1. A preparation method of AM-type polystyrene microsphere ofloxacin imprinted polymer, comprising:
   (1) activating polystyrene primary amine resin microspheres by:
      immersing polystyrene primary amine resin microspheres in a N,N-dimethyl formamide solution for 6-8 h, washing the polystyrene primary amine resin microspheres with distilled water sufficiently, and drying in vacuum for 20-28 hours until constant weight, to thereby obtain activated polystyrene primary amine resin microspheres;
   (2) grafting of AM on polystyrene primary amine resin microspheres by:
      adding 0.3-0.5 g the activated polystyrene primary amine resin microspheres into a four-neck flask equipped with an electric stirrer and a reflux condenser, subsequently adding 8-12 mL acrylamide monomer and a solvent ethyl alcohol, then removing nitrogen, and heating; after reaching 25-35° C., adding an initiator ammonium persulfate, reacting at a temperature condition of 25-35° C. for 6-10 h until termination; washing the microspheres with distilled water repeatedly and drying in a vacuum until constant weight, to thereby obtain grafted particles PAM/PSA; and
   (3) preparing surface molecularly imprinted materials:
      the grafted particles PAM/PSA generate strong adsorption to levofloxacin to reach adsorption equilibrium, then with use of a surface imprinting technology, employing saturated adsorption AM grafted polystyrene primary amine resin microspheres, adding an ethyl alcohol solution and 0.005 g/L of levofloxacin solution as a solvent, and adding ethylene glycol diglycidyl ether as the crosslinking agent to thereby prepare a levofloxacin surface molecularly imprinted material MIP-PAM/PSA.

2. The preparation method of AM-type polystyrene microsphere ofloxacin imprinted polymer according to claim 1, wherein: immersing PSA resin with N-N' dimethyl formamide so as to activate groups on the surface of the polymer; in an organic solvent ethyl alcohol, using ammonium persulfate as the initiator, grafting a functional monomer acrylamide onto polystyrene primary amine resin microspheres through free radical polymerization; the preparation conditions are: temperature is 30° C.; the solvent is ethyl alcohol; an amount of the monomer acrylamide accounts for a mass fraction of 11.01% in a reaction solution; the initiator accounts for a mass fraction of 8.80% in the monomer, and then graft polymerization and reaction for 8 h.

3. The preparation method of AM-type polystyrene microsphere ofloxacin imprinted polymer according to claim 1, wherein: the grafted particles PAM/PSA will generate strong adsorption to ofloxacin: adsorption equilibrium can be reached within 3 hours, adsorption temperature is 35° C.; when adsorptive pH-3, maximal adsorption capacity is 113 mg/g.

* * * * *